United States Patent [19]

Stalter

[11] Patent Number: 4,682,820
[45] Date of Patent: Jul. 28, 1987

[54] VEHICLE WHEEL WITH AN ORNAMENTAL PLASTIC OVERLAY

[75] Inventor: Robert J. Stalter, Bowling Green, Ohio

[73] Assignee: Motor Wheel Corporation, Ohio

[21] Appl. No.: 788,156

[22] Filed: Oct. 16, 1985

[51] Int. Cl.⁴ .............................................. B60B 7/02
[52] U.S. Cl. ............................ 301/37 P; 301/37 CM; 301/37 H; 301/108 R; 24/662; 24/674
[58] Field of Search ................. 301/37 R, 37 P, 37 C, 301/37 CM, 37 H, 108 R, 108 A, 63 R; 24/108, 662, 673, 674

[56] References Cited

U.S. PATENT DOCUMENTS

| | | | |
|---|---|---|---|
| 3,669,501 | 6/1972 | Derleth | 301/37 P X |
| 3,762,677 | 10/1973 | Adams | 301/37 P X |
| 3,918,762 | 11/1975 | Hampshire | 301/37 P |
| 3,998,494 | 12/1976 | Spisak | 301/37 C X |
| 4,398,770 | 8/1983 | Smith | 301/37 P X |

FOREIGN PATENT DOCUMENTS

2447575  4/1976  Fed. Rep. of Germany .... 301/37 P

*Primary Examiner*—David A. Scherbel
*Attorney, Agent, or Firm*—Barnes, Kisselle, Raisch, Choate, Whittemore & Hulbert

[57] ABSTRACT

A composite styled wheel including a metallic disc and rim and an ornamental plastic overlay permanently affixed to the disc and/or rim. The overlay has a central cavity adapted to receive wheel hub and mounting parts therein inserted into said disc. A retainer is secured to the body and is spaced radially outwardly from the cavity surface, the overlay material engulfing the retainer so as to at least partially embed the same in the overlay to thereby hide the retainer from view and assist in securement thereof to the body. The body and retainer have cooperative detent structure disposed in the vicinity of the outboard face of said body encircling the outboard entrance to the body cavity and adapted to yieldably releasably engage a center ornament hub cap or the like for removable attachment of the same to the body to close the outboard end of the body cavity. In one form the retainer comprises a split annular wire member having radially re-entrant bowed portions disposed within circumferentially spaced detent projections of said body to reinforce the same. In another form the retainer has a generally hoop-like configuration with a series of circumferentially spaced anchor bit portions extending axially from the plane of the hoop and radially outwardly therefrom toward the disc. The retainer also is circumferentially continuous and has arcuate portions between the bite portions contiguous with the body cavity surface. A method and apparatus for molding a composite styled wheel is also disclosed.

12 Claims, 15 Drawing Figures

VEHICLE WHEEL WITH AN ORNAMENTAL PLASTIC OVERLAY

This invention relates to styled wheels for vehicles, and more particularly to a composite metal-elastomer automotive-type styled vehicle wheel construction with a three-dimensional deeply contoured ornamental outboard face, and to molding apparatus and method for constructing such a wheel.

In the early 1970's Motor Wheel Corporation of Lansing, Mich., assignee of applicant herein, as well as its parent, The Goodyear Tire & Rubber Company of Akron, Ohio, developed and introduced an improved form of composite metal-elastomer styled wheel marketed under the registered trademark "POLYCAST". Such styled wheels provided an automotive type wheel in which metallic parts of simple, conventional configuration, for which manufacturing equipment was already available, are utilized as the basic structural components to thereby obtain a high strength standardized wheel construction at minimum cost. The aesthetically pleasing appearance was imparted to this standard steel backbone by a permanently adhered ornamental plastic body, either molded separately or in situ as a homogeneous one-piece body or in the form of a plastic cover secured by an adhesive foam body to the outboard side of the wheel. This provided an improved anti-noise characteristic to the wheel and enabled the appearance of the wheel to be readily and economically varied to suit different customer's styling requirements without varying the basic structural components of the wheel. Additional benefits resided in the side impact cushioning to prevent damage to the wheel while retaining the high strength and impact resistance advantages of the time-proven conventional ductile steel wheel components. Wider variations in styling and contour configurations were also obtained than were possible in the previous deep drawn styled all-steel wheels.

Various embodiments of such "POLYCAST" wheels, as well as methods and apparatus for producing the same, are set forth in the following U.S. Patents assigned either to the assignee herein or its parent, The Goodyear Tire & Rubber Company, which are incorporated herein by reference: U.S. Pat. No. 3,669,501, 6/1972, Derleth; U.S. Pat. No. 3,756,658, 9/1973, Adams; U.S. Pat. No. 3,762,677, 10/1973, Adams; U.S. Pat. No. 3,815,200, 6/1974, Adams; U.S. Pat. No. 3,918,762, 11/1975, Hampshire; U.S. Pat. No. 3,794,529, 2/1974, Thompson; U.S. Pat. No. 3,935,291, 1/1976, Jackson; U.S. Pat. No. 3,956,451, 5/1976, Adams; U.S. Pat. No. 4,398,770, 8/1983, Smith.

Other prior art patents issued to unrelated parties and directed to various facets of such styled composite metal and plastic wheels include U.S. Pat. Nos. 3,823,982, and 3,998,494 as well as British Pat. No. 1,290,946 (1972).

In the manufacture of such POLYCAST wheels, a portion of the mold comprises a conventional metal vehicle wheel having a drop center rim secured to a central disc or body having the usual bolt circle holes and a central aperture so that the disc can be mounted on an axle, drum or disc brake assembly. The metal wheel is employed in conjunction with an upper back-up clamp and lower mold part to define therewith a sealed cavity for molding and attaching a three-dimensional contoured plastic overlay, the overlay thus being molded in situ and permanently attached to the outboard side of the wheel in the mold apparatus. Preferably, the wheel forms the upper surface of the mold cavity and a reaction mixture of a urethane elastomer liquid adhesive material is injected or poured into the mold to fill the cavity and contact the outboard surface of the wheel assembly. The urethane material solidifies to form a high density non-cellular elastomer body which permanently adheres to the outboard surface of the wheel subassembly. The plastic overlay may also be constructed from a lower density microcellular closed cell urethane elastomer adhesive material. The urethane material is allowed to solidify in the mold cavity and then the mold is opened so that the wheel with the overlay securely adhered to it may be removed from the mold. The overlay may then be painted or otherwise covered with a decorative coating to provide a finished metallic-appearing ornamental wheel. The urethane elastomer thus forms a plastic body having a three-dimensional contour which is permanently attached to the outboard side of the wheel to provide a decorative surface, and the elastomer overlay appears to be an integral portion of the metal wheel.

In almost all of such POLYCAST wheel designs the wheel disc and plastic overlay are provided with a center throughopening coaxial with the wheel hub and wheel spindle to provide a suitable space for receiving the vehicle wheel spindle therein. Customarily, a separate hub cap or center ornament is detachably mounted in the center opening of the outboard face of the wheel overlay to close the wheel spindle cavity. Such hub caps are usually made of chrome-plated or bright metal or suitable plastic and are fashioned with a decorative styling complemental to the wheel, and usually bear the vehicle manufacturer's trademark.

Generally, in the past, two systems of hub cap retention have been employed with such POLYCAST wheels. One type of system is that disclosed, for example, in the above-listed Derleth U.S. Pat. No. 3,669,501 and the Smith U.S. Pat. No. 4,398,770 wherein a so-called metallic "dixie cup" is attached directly to the metal disc of the wheel and protrudes axially in an outboard direction therefrom to define the wheel spindle cavity. The "dixie cup" then removably receives at its hollow outboard end a suitable decorative hub cap. While this system is quite workable and has been used successfully in millions of POLYCAST wheels, the same is somewhat expensive, both from the standpoint of manufacture of the "dixie cup" itself as well as assembly to the disc.

The other type of ornamental retention employed in such POLYCAST wheels is where the hub cap, whether of plastic or metal construction, is secured only to the urethane material of the plastic overlay and thus only indirectly to the metal components of the wheel. Some examples of this type of hub cap retention are illustrated in the aforementioned Hampshire U.S. Pat. No. 3,918,762 as well as in the Spisak U.S. Pat. Nos. 3,823,982 and 3,998,494. These indirect attachment systems are advantageous in that they eliminate the aforementioned "dixie cup" insert, and, hence, the cost and the weight of the same. However, such ornament retention is dependent in part on the urethane foam properties, and for security and reliability generally requires a relatively expensive urethane material of relatively high density to provide sufficient strength for secure attachment under adverse conditions. In addition, uniformity in retention strength from wheel to wheel is difficult to maintain and particularly a problem if it is desired to vary the urethane foam properties, such as hardness, density, etc. Moreover, the current practice of designing retention nubbins or recesses into the urethane foam around the inner periphery of the wheel spindle cavity is severely limited because of problems of die lock in the manufacturing process as well as the limited strength properties of the urethane foam material. The indirect attachment system also sets limitations on the choice of urethane foam materials to be employed in the plastic overlay due to the need to be concerned with the temperature sensitivity of the urethane foam as well as its compression set and creep properties.

Accordingly, objects of the present invention are to provide an improved composite metal-elastomer construction of the aforementioned "POLYCAST" styled wheel type which overcomes the aforesaid problems of mounting the removable ornamental hub cap to the outboard face of the wheel; provide uniform ornament retention properties to the wheel independent of and superior to that obtainable with the urethane material alone; enable a broader range of selection of urethane materials which are lower in cost and weight without endangering center ornament retention; provides a retention system independent of the steel backbone or disc of the wheel construction; accomplish these objectives at less expense than other prior means of retention such as the use of the aforementioned "dixie cup" attached to the steel backbone or disc; provide an improvement in the retention force over the aforementioned direct attachment systems; and eliminate the concern over the temperature sensitivity of the urethane foam material and its compression set and creep properties.

Another object of the present invention is to provide an improved method of making a composite wheel of the above character in an economical and reliable manner.

A further object is to provide improved mold apparatus for practicing the aforementioned improved method to construct the aforementioned wheel of the present invention.

Other objects, as well as features and advantages of the present invention will become apparent from the following detailed description taken in conjunction with the accompanying drawings, wherein:

Figure 1:
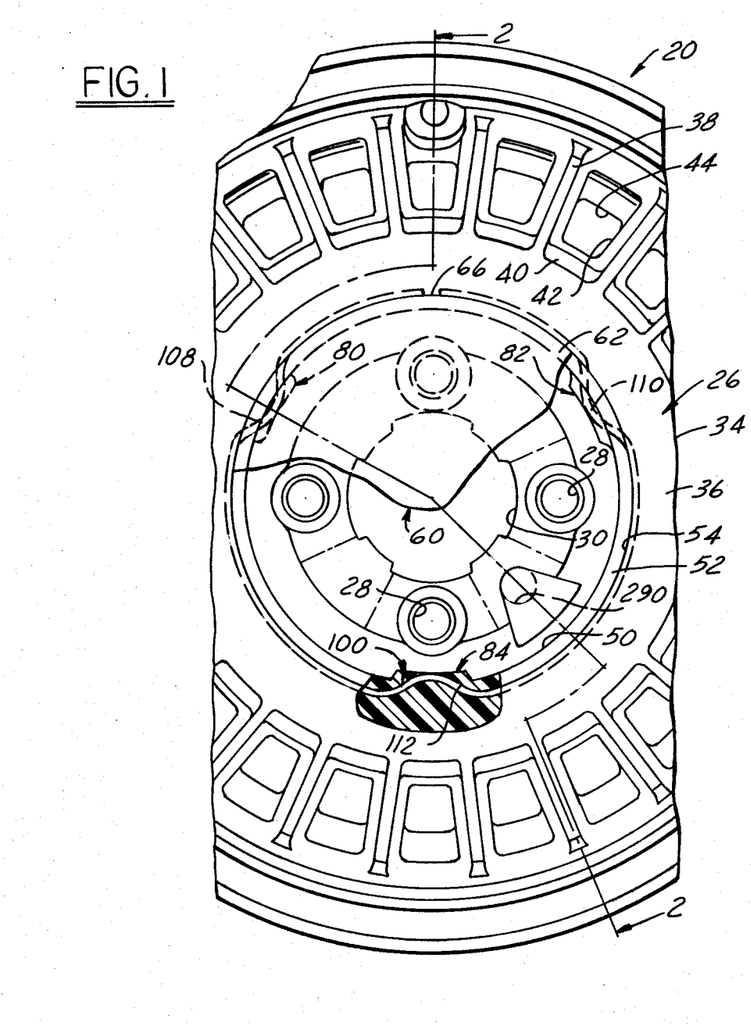
FIG. 1 is a fragmentary elevational view of an exemplary embodiment of a vehicle wheel constructed in accordance with the present invention as viewed from the outboard face thereof, with certain portions broken away to better illustrate detail.
Figure 2:
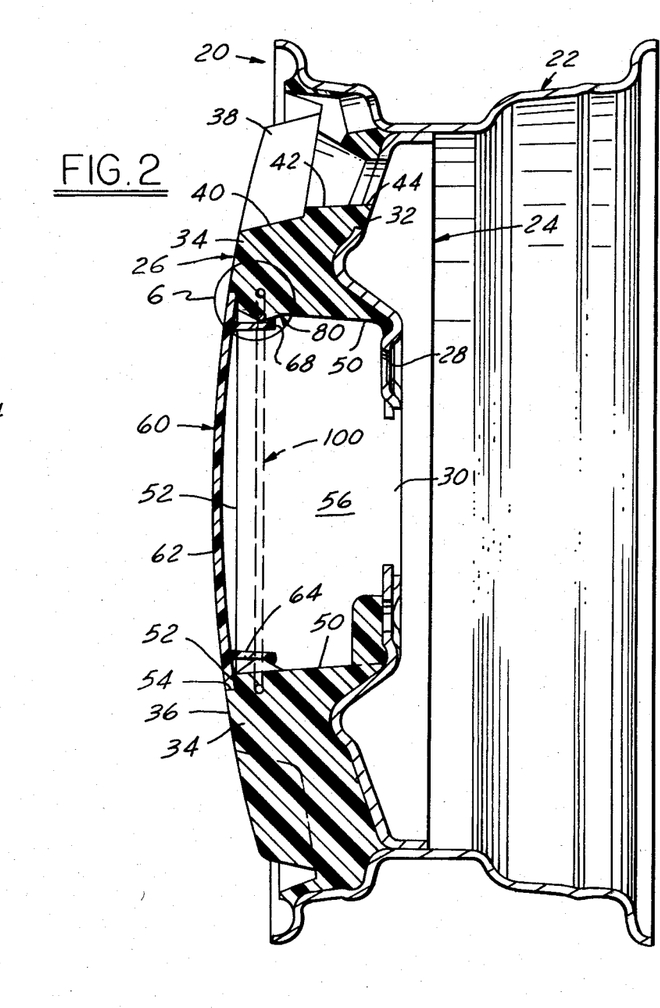
FIG. 2 is a cross sectional view taken on the line 2—2 of FIG. 1.

Referring in more detail to the accompanying drawings, FIGS. 1 and 2 illustrate an exemplary, but preferred, embodiment of a wheel constructed in accordance with the present invention, utilizing the apparatus and made by the method of the invention. The wheel is generally designated 20 and comprises, by way of a preferred example, a conventional drop center steel rim 22, a central steel disc or body 24, and an ornamental three-dimensional contoured overlay, generally designated at 26, secured to the outboard face of disc 24 and to the outboard surface of rim 22. Disc 24 is provided with a circle of bolt holes 28 and a central wheel spindle aperture 30 so that wheel 20 can be removably attached to a wheel hub and associated disc or drum brake assembly. For decorative purposes and for brake ventilation, a plurality of cut-outs or vent holes 32 are provided in disc 24. The particular configuration of the steel components of wheel 20, including rim 22 and disc 24, may follow solely utilitarian considerations such as strength of the wheel and ease and economy of manufacture, since the aesthetic appearance of the wheel is determined largely by the three-dimensional contour of the ornamental overlay 26. The three-dimensional contours of overlay 26 in turn are determined by the particular ornamental or aesthetic appearance desired by the designer of wheel 20.

In the ornamental design of FIGS. 1 and 2, overlay 26 is provided with a central annular section 34 having a generally smooth convex outer face 36 with a plurality of fins 38 radiating outwardly from an outer peripheral wall 40 of section 34. Pockets 42 are provided between each adjacent pair of fins 38 which extend axially inboard to provide a urethane aperture 44 within each disc aperture 32. Section 34 of overlay 36 has an internal, slightly frusto-conical wall 50 diverging outboard axially of the wheel and terminating at its outboard edge at a shoulder surface 52 which extends radially outwardly from the outer edge of wall 50 to an axially extending cylindrical surface 54. Wall 50 defines a relatively large cavity 56 in overlay 26 and is adapted to receive the vehicle wheel spindle therein in a mounted condition of wheel 20.

Figure 4:
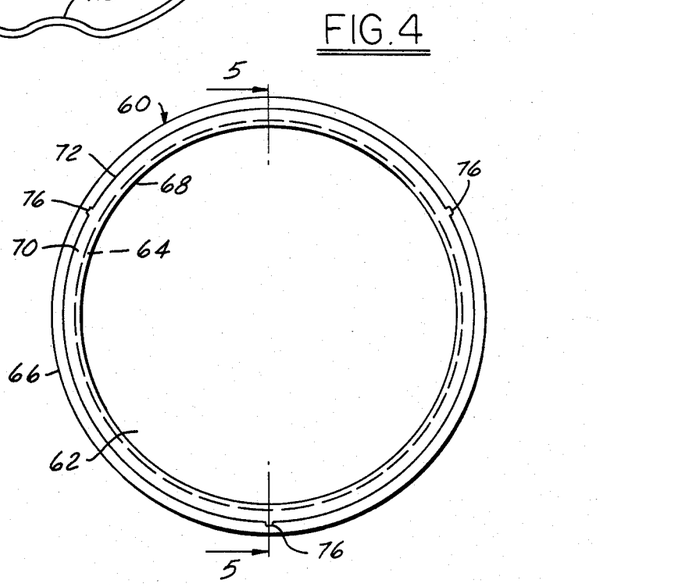
FIG. 4 is a rear elevational view of a conventional plastic detachable wheel ornament hub cap utilized with the embodiment of FIGS. 1 through 8.
Figure 5:
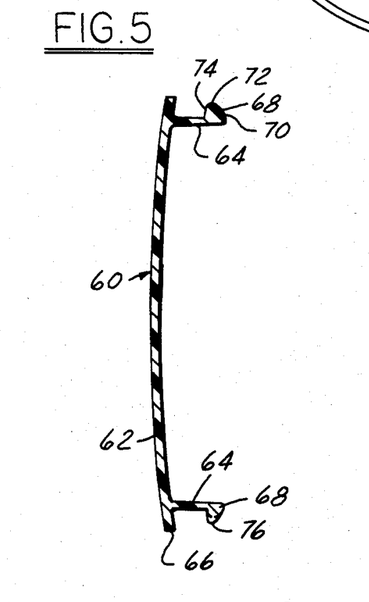
FIG. 5 is a sectional view taken on the line 5—5 of FIG. 4.

Wheel 20 is also provided with a removably attached center ornament or hub cap 60 of conventional construction which is releasably secured onto overlay 26 to cover the central spindle cavity 56. Cap 60 is shown by itself in FIGS. 4 and 5 and comprises an injection molded plastic part having a circular wall 62 with a slight convex curvature outboard of the wheel to match the curvature of face 36 of overlay 26. Cap 60 also has a cylindrical flange 64 which extends axially from the inboard face of the cap and which is radially inwardly offset from the outer peripheral edge 66 of wall 62. The inboard free edge of flange 64 has an integral annular cam lip 68 protruding radially outwardly therefrom. Lip 68 has a cam surface 70 inclined at an angle of about 30° to the axis of cap 60 with a radiused outer edge 72 and a generally radially extending surface 74 on the outboard side of lip 68. Lip 68 has three equally angularly spaced nubbins 76 (FIG. 4) protruding radially outwardly therefrom.

In order to provide snap-in retention of cap 60 onto overlay 26, and also in accordance with past practice, section 34 of overlay 26 is provided with three equally angularly spaced nubbins 80, 82, 84 (FIG. 1) which protrude radially and inwardly from wall 50 adjacent the outboard edge thereof. Referring to nubbin 80 (FIGS. 1, 2 and 6), the same extends circumferentially of opening 56 about 25°. The radially inwardly facing surface of each nubbin 80, 82, 84 is defined by a pair of inclined surfaces 86 and 88 which extend at about a 15° angle to wall 50 in inboard and outboard directions, respectively, and converge at an apex or ridge line 90 in the center of nubbin 80 axially of the wheel.

Figure 3:
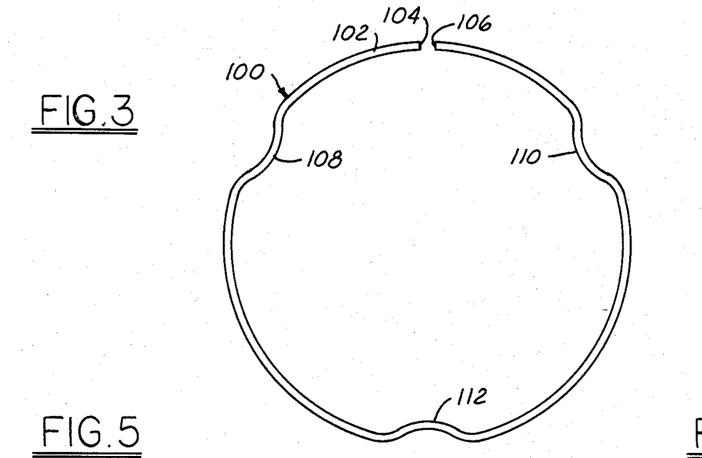
FIG. 3 is a plan view of a first embodiment of a retainer employed in the embodiment of FIGS. 1 through 8, the retainer being shown by itself in its free state condition.
Figure 6:
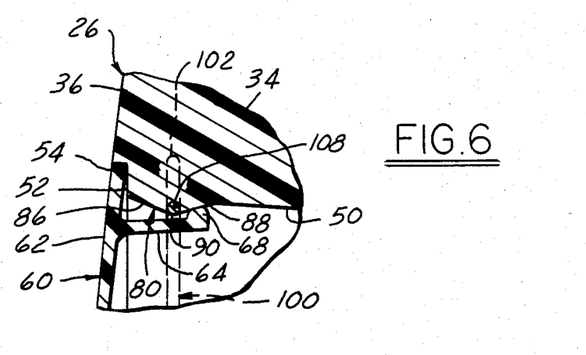
FIG. 6 is a fragmentary cross sectional view of the detail shown in the circle labeled "6" in FIG. 2, but greatly enlarged thereover.

In accordance with a principal feature of the present invention, wheel 20 is provided with a hub cap retention reinforcing retainer 100 which, in the embodiment of FIGS. 1–8, is in the form of a tempered spring steel wire 102 having a generally circular configuration. Wire 102 is split such that its free ends 104 and 106 define a gap therebetween in the free state condition as shown in FIG. 3. Wire 102 is formed to a given diameter, for example, 0.172 mm, selected to exceed the diameter of wall 50 at nubbins 80,82,84 by a given amount, for example by 16 mm, to provide a firm embedment of wire 102 in the urethane material of overlay 26. Retainer 100 is molded into this material, as set forth in more detail hereinafter, so as to thus be fully encapsulated, except at three hub-cap retention contact points coincident with the nubbins 80,82,84. To this end, retainer 100 is provided with three equally angularly spaced inwardly bowed portions 108,110,112 each having a radius of curvature, for example 25 mm, such that each bowed portion dips radially inwardly to be substantially tangent with the center of each associated nubbin, as best seen in FIGS. 1, 2 and 6. The bowed portions are also circumferentially oriented such that their apices surface at the circumferential center of the associated nubbin crest 90 relative to each nubbin. Hence, each urethane retention nubbin 80,82,84 is materially structurally reinforced by the associated wire bends embedded therein.

When retainer 100 is made of tempered spring steel wire, the retainer itself can provide substantially all of the resilience to accommodate the snap-in retention of hub cap 60. Alternatively, other materials with different properties may be specified for retainer 100, ranging from soft steel to certain plastic materials with low creep and good fatigue properties. In such instances the retainer 100 may have less resilience, but still be flexible, and serve more as a back-up reinforcement for the urethane material of overlay 26, with the latter material being relied upon to provide a good portion of the resiliency or spring-back force for the snap-in retention of cap 60. The split in retainer 100 enables the same to more freely contract and expand, both during mold release and in subsequent operation relative to insertion and removal of hub cap 60 to overlay 26.

Figure 7:
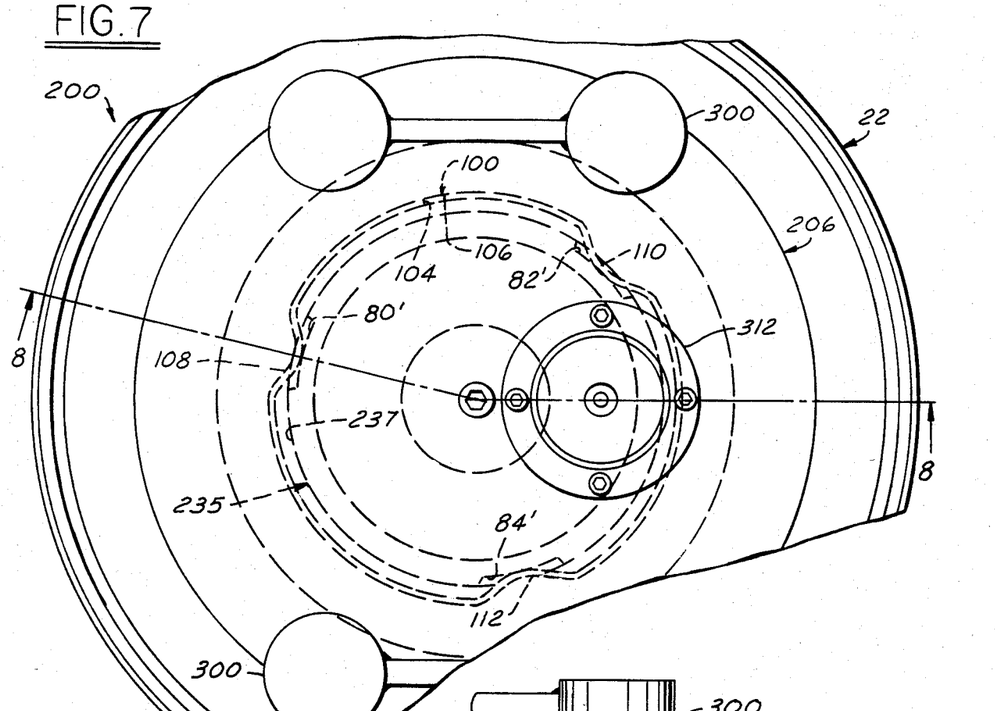
FIG. 7 is a fragmentary top plan view of an improved molding apparatus of the present invention employed in the construction of the embodiment of the wheel shown in FIGS. 1 and 2.
Figure 8:
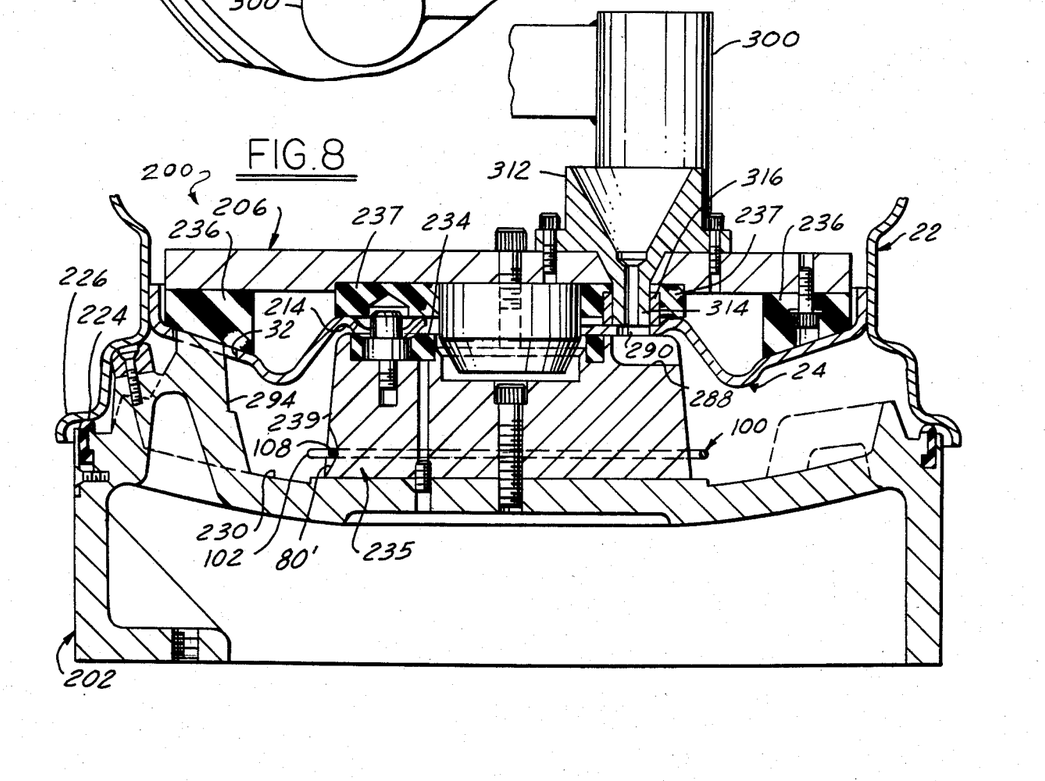
FIG. 8 is a cross sectional view taken on the line 8—8 of FIG. 3.

FIGS. 7 and 8 illustrate an improved molding apparatus and improved method of making wheel 20 utilizing such apparatus, which incorporate many of the features of the molding apparatus and method illustrated in conjunction with FIGS. 7–11 of the aforementioned Adams U.S. Pat. No. 3,762,677, which is incorporated herein by reference. Likewise, the molding apparatus or mold 200 described in columns 11–16 of the U.S. Pat. No. 3,762,677 is incorporated herein by reference, and identical reference numerals are employed in FIGS. 7 and 8 to identify elements alike in structure and/or function.

Mold apparatus 200 comprises three main components; namely, a lower mold part 202 (FIG. 8), the metal vehicle wheel subassembly 22–24, and an upper half 206 which serves as a backup support for clamping wheel 22–24 onto mold part 202. Lower mold part 202 has an annular lip in the form of a resilient seal 224 adapted to seat against an annular portion of the outboard face of rim 22. Mold part 202 also has a surface 230 on its upper side radially inwardly of seal 224 adapted to define, with the outboard face of wheel subassembly 22–24, a mold cavity in which the decorative plastic overlay 26 is cast, the same being suitably contoured to provide the ornamental configuration to form the outboard face of wheel 20 as shown in FIGS. 1 and 2.

To assemble mold 200, wheel subassembly 22–24 is placed against part 202 as shown in FIG. 8 with flange 226 of rim 222 resting on or in light contact with seal 224. This also lightly seats the bolt circle portion 214 of disc 24 against an annular inner seal 234 mounted on the upper face of a mold pedestal 235 which in turn is suitably secured to the center of face 230 of mold part 202. Pedestal 235 provides a core to form the wall 50 defining the wheel well cavity 56 and overlay 26. Seal 234 is adapted to seal the mold cavity around its inner perimeter in the fully seated condition of wheel subassembly 22–24 on mold part 202.

The upper mold part 206 is then urged downwardly against wheel sub-assembly 22–24 as shown in FIG. 8. Mold part 206 has a resilient annular pad 236 having a configuration on its underside adapted to seat against the inboard face of disc 24 to thereby force the disc-rim subassembly 22–24 further toward part 202 and then retain parts 202 and 22–24 in sealing engagement. Upper part 206 also has an annular seal 237 radially inwardly of seal 236 which seats on the bolt circle portion 214 of the inner face of disc 24. A steel funnel 312 is secured on the upper surface of clamp 206 and has a neck 314 which extends downwardly through a washer seal 316 and seal 237 into engagement with a pour opening 290 provided in disc 24 between a pair of adjacent bolt holes 28 therein. Pedestal 235 has a notch 288 in the upper surface thereof which registers with pour opening 290 and neck or spout 314 to serve as a sprue for directing the liquid urethane reaction mixture into the mold cavity during pouring of the mold. Further details and features of mold 200 as well as details of structure, function and operation of various elements thereof may be had by reference to the aforementioned U.S. Pat. No. 3,762,677.

In accordance with the present invention, ornament retainer 100 is assembled to mold part 202 prior to seating of the disc-rim subassembly 22-24 thereon. Such assembly simply involves slipping retainer 100 downwardly along the sloping frusto-conical side wall 239 of pedestal 235 until the bowed-in portions 108, 110 and 112 respectively register with and snap into the associated nubbin cavities 80', 82' and 84' already provided in pedestal 235 in accordance with previous practice to form nubbins 80, 82 and 84, respectively. The resilience of wire 202 allows it to expand radially as bowed-in portions 108,110,112 slide down surface 237, the gap between the free ends 104 and 106 of wire 102 widening as this occurs. This resilience also causes the wire 102 to snap back to its captured position shown in FIGS. 7 and 8 with the bowed portions 108-112 seated in nubbin cavities 80'-84'. In this condition wire 102 is self-supporting so as to protrude radially outwardly from pedestal 235 into the mold cavity, retainer 100 thereby being properly seated and oriented for embedment in the liquid urethane reaction mixture when poured into the mold cavity to produce overlay 26 as shown in FIGS. 1 and 2.

After the urethane has cured and solidified, the foregoing mold assembly procedure is reversed to open mold 202 and to remove the finished wheel 20 therefrom, the ornamental plastic overlay 26 with retainer 100 embedded therein having now become a permanent decorative fixture on disc-rim sub-assembly 22-24. During upward stripping of wheel 20 from mold part 202, nubbins 80-84 and associated retainer bowed portions 108-112 are expanded outwardly by the upper slope of nubbin cavities 80'-84' until clear of pedestal 235, whereupon the same spring back to their as-cast position in the finished product as shown in FIGS. 1 and 2.

Figure 9:
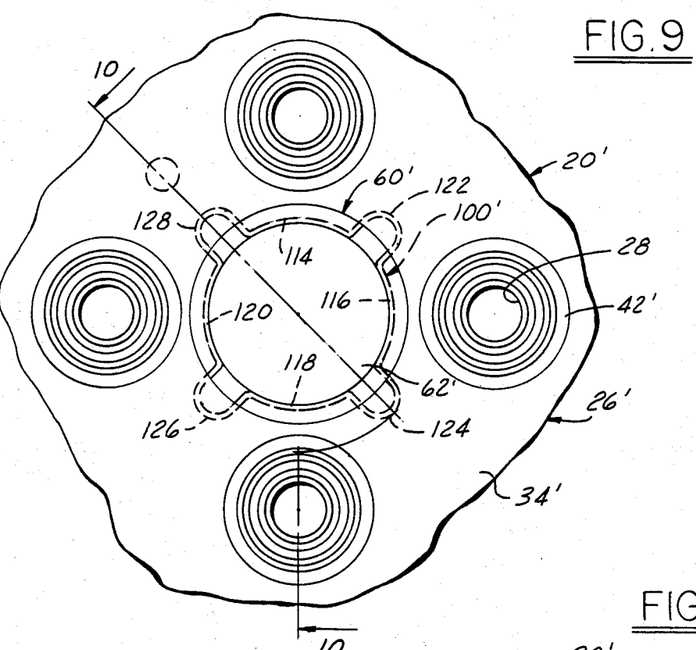
FIG. 9 is a fragmentary elevational view of the outboard face of a modified wheel construction also in accordance with the present invention.
Figure 10:
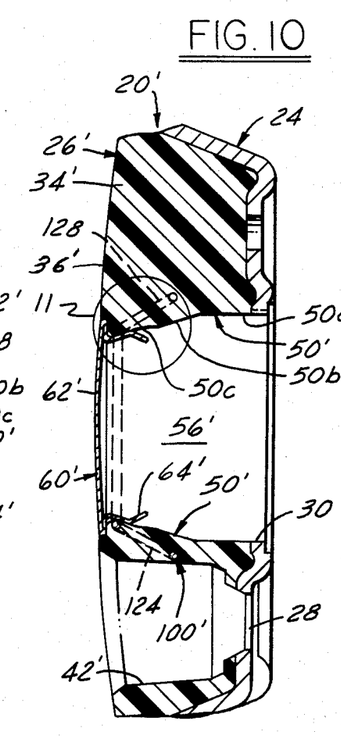
FIG. 10 is a cross sectional view taken on the line 10—10 of FIG. 9.
Figure 11:
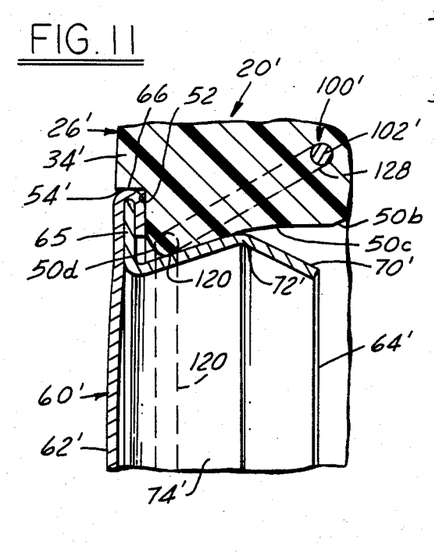
FIG. 11 is a fragmentary cross sectional view of the portion of FIG. 10 indicated by the circle 11 therein, but greatly enlarged thereover.

Referring to FIGS. 9-11, another embodiment 20' of an improved wheel constructed in accordance with the present invention is illustrated fragmentarily therein. Structural elements identical to those previously described in conjunction with wheel embodiment 20 are given like reference numerals and reference numerals raised by a prime suffix indicate structure corresponding in function and operation to that previously described. Thus, wheel 20' has a metal disc 24 and associated metal rim 22 (not shown), and an ornamental elastomeric urethane body 26' molded against the outboard face of disc 24 and contiguous portions of rim 22 to provide a decorative contour on the outboard face of the wheel. The center of overlay 26' has a wheel spindle cavity 56' defined generally by an annular wall 50' made up of a large diameter cylindrical wall 50a coincident with wheel disc center opening 30 and extending in an outboard direction therefrom. Wall 50a intersects a frusto-conical wall 50b which extends therefrom in an outboard direction to an intersection with a concave wall 50c. Wall 50c in turn merges with a radius wall 50d which, as best seen in FIG. 11, extends radially outward to merge with a hub cap seating surface 52' bounded by an internal shoulder 54' (FIGS. 10 and 11).

Figure 15:
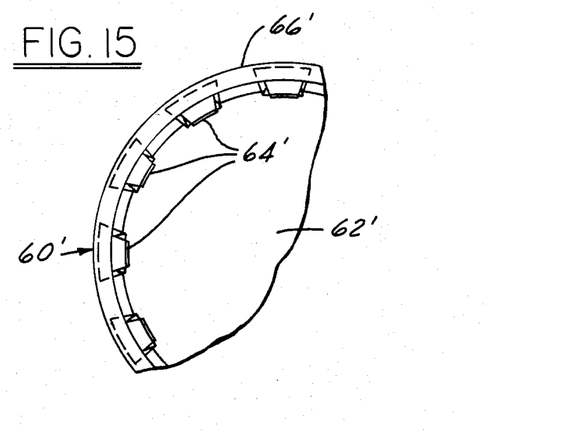
FIG. 15 is a fragmentary rear elevational view of the ornamental hub cap employed with the wheel construction of FIGS. 9 through 11.

Wheel 20' is adapted to detachably receive a center ornament or hub cap 60' which, like hub cap 60, is of conventional construction. However, cap 60' differs from hub cap 60 having a plurality of angularly spaced spring fingers 64' (FIG. 15), each having a foot portion 65 (FIG. 11) crimped under a return bent outer edge 66' of hub cap 60'. Each finger 64' has a griping portion 74' extending axially at an incline radially outwardly from foot 65 and terminating in a camming portion 70' bent radially inwardly from portion 74'. Spring fingers 64' are thus adapted to be flexed radially inwardly as the hub cap 60' is inserted axially in an inboard direction into center opening 56', the fingers being yieldable to slide past the minimum constricting surface 50d at the entrance to cavity 56' and then spring back outwardly to releasably grip the hub cap with the same seated against shoulder 52' of overlay 26', as shown in FIGS. 9-11.

Figure 14:
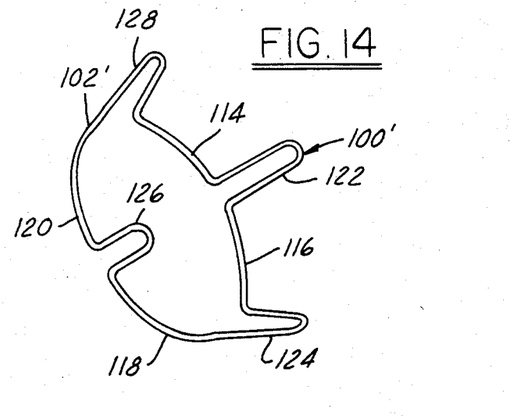
FIG. 14 is a perspective view of the modified retainer employed in the wheel construction of FIGS. 9 through 11.

In accordance with the principal feature of the present invention, snap-in wheel retention of hub cap 60' is indirectly to the elastomeric material of overlay 26' rather than directly to the metallic disc 24 of the wheel. Such retention is again provided in a uniform and consistent manner regardless of variations in the material of overlay 26' by means of a modified hub cap retention reinforcing retainer 100' embedded into the elastomeric material of overlay 26'. Retainer 100', like retainer 100, is in the form of a resilient wire spring with angularly spaced portions surfacing at the constricting wall surface 50d. However, as best seen in FIG. 14, retainer 100' comprises a continuous loop of steel wire 102' suitably shaped to form an interrupted circle defined by four curved segment portions 114,116,118,120 interconnected by four radially outwardly and axially inwardly extending bite anchor portions 122,124,126,128. Retainer 100' is embedded in the urethane material of overlay 26' so as to be positioned as shown in FIGS. 9, 10 and 11 relative to spindle opening 56'. As best seen in FIG. 11, each of the arcuate segments 114-120 lies just beneath the surface of the urethane material, the circular wire stock having a smaller radius of curvature than that of surface 50d and being tangent thereto at the minimum diameter portion of wall 50'. The bite portions 122-128 extend back from the associated segment portions in an inboard direction and radially outwardly at a greater angle than wall surfaces 50c and 50b, so as to serve as anchors in the urethane material of overlay 26' for the reinforcing spring sections 114-120.

In operation of the hub cap retention system of wheel 20', cap 60' is inserted from left to right as viewed in FIGS. 10-11 into opening 56' to first bring the cam portion 70' of each finger 64' against surface 50d. As cap 60' is pushed further inwardly (to the right as viewed in FIGS. 10-11), the spring fingers of the cap will yield radially inwardly due to their resilience, and also the urethane material will yield radially outwardly, as will retainer 100', until the fingers reach the point where they can expand as they register with concave wall surface 50c, portion 74' of each finger thus being locked axially inwardly and radially outwardly of the associated wire segment 114-120.

It will thus be seen that reinforcing retainer 100', like retainer 100, provides uniform ornament retention properties to the wheel 20' independent of and superior to that obtainable alone with the urethane elastomer material employed in overlay 26'. Since ornament retention is no longer dependent on the urethane foam properties, the wheel designer has the option of using less expensive and/or lighter weight materials without fear of loss of hub cap retention. Again, retainer 100', like retainer 100, is molded in-situ in the urethane material of the decorative overlay and is fully encapsulated therein, except at the retention contact points, and is not attached, other than indirectly through the urethane material, to the steel disc 24. Whatever resiliency, flexibility or stiffness parameters may be desired in retainer 100' can be specified by the designer, for example ranging from soft steel to tempered spring wire. It will also be understood that other design configurations of split or continuous retention reinforcing members may be provided in accordance with the invention, including stamped sheet metal members or injection molded plastic members. Although metal is the material of choice in practice of the present invention, certain plastic materials with low creep or good fatigue properties are also acceptable selections for use in retainer 100'. Retainer 100', as with retainer 100, thus eliminates the wheel designer's concern over the temperature sensitivity of the urethane foam of the overlay 26' as well as its compression set and creep properties because ornament retention properties may be maintained uniform throughout a variety of designs independent of the urethane foam properties.

Figure 12:
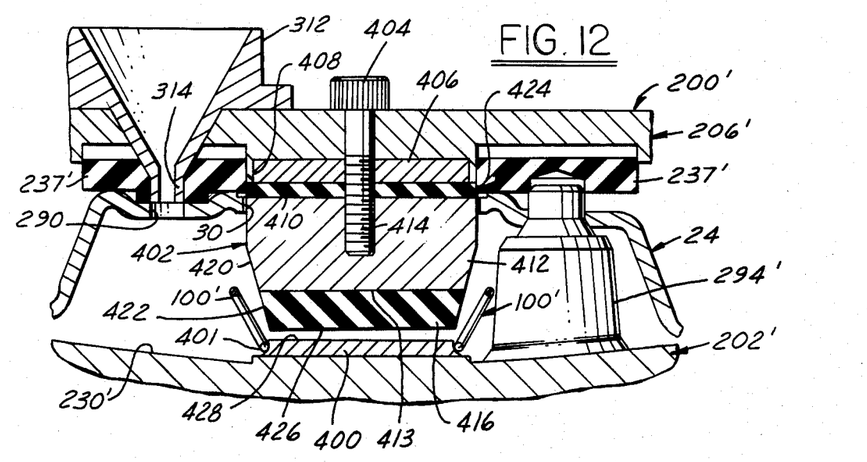
FIG. 12 is a fragmentary cross sectional view of a modified mold apparatus of the present invention adapted for making the modified wheel construction of FIGS. 9 through 11, the mold being shown in partially closed position in FIG. 12.
Figure 13:
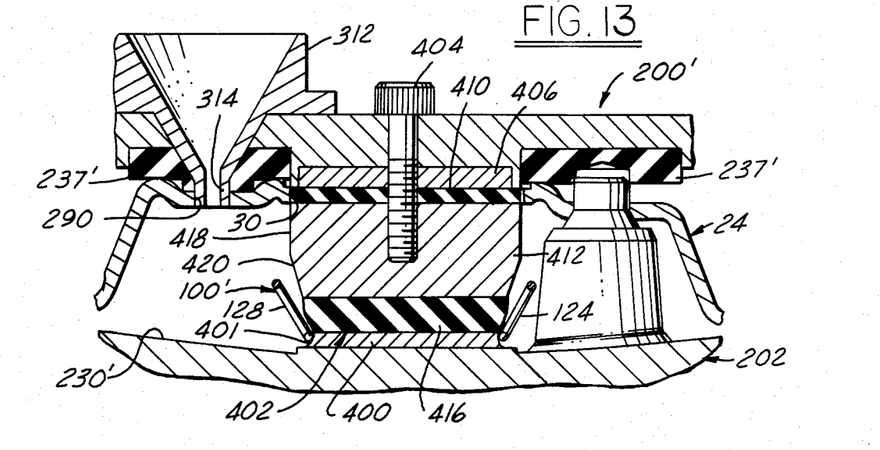
FIG. 13 is a cross sectional view of the mold of FIG. 12 with the same shown in fully closed position ready for casting of urethane.

Referring to FIGS. 12 and 13, wheel 20' is preferably constructed using the modified mold apparatus 200' shown therein. Modified mold apparatus 200' differs from apparatus 200 in that the lower mold part 202' does not have the central pedestal 235. Instead a short annular core piece 400 is suitably fixed to surface 230' coaxial with the mold and wheel center, and is shaped to form the center opening wall surface 50d of overlay 26'. Upper mold part 206' differs from back-up 206 in having a core structure 402, which is secured to its underside centrally thereof by a stud 404. Core structure 402 is a multi-piece lamination comprising a circular steel back-up plate 406 seated in a circular cavity 408 in the under surface of upper mold part 206'. A resilient cushion-seal 410 is clamped against the under side of back-up 406 by a metal disc 412 having a central threaded bore 414 threadably receiving stud 404. The lower face 413 of disc 412 has a resilient disc 416 secured thereto by a suitable adhesive.

In the closed condition of mold 200', as shown in FIG. 13, a cylindrical surface 418 of disc 412 defines a mold cavity surface which forms overlay wall 50a, and a frustoconical surface 420 of disc 412 defines the mold cavity surface which forms overlay wall 50b. In the partially opened or released condition of upper mold part 206' shown in FIG. 12, cushion-seal 416 has a frusto-conical outer surface 422 forming a smooth extension of surface 420 in the relaxed state of seal 416. Upper cushion-seal 410 has a cylindrical outer periphery 424 in its relaxed condition having an outside diameter providing a slight clearance with the inner periphery of disc center opening 30, and of the same diameter as disc surface 418. The lowermost face 426 of seal 416 has the same diameter as the upper face 428 of pedestal 400.

In the operation of modified mold apparatus 200', and prior to placing the wheel disc-rim subassembly 22-24 onto lower mold part 202', retainer 100' is snugly seated on pedestal 400 as shown in FIG. 12 with segments 114-120 engaging the concavely curved peripheral surface 401 of pedestal 400. In this condition, retainer 100' is self-supporting and bite portions 122-128 protrude upwardly and outwardly away from the center of the mold cavity. Disc-rim subassembly 22-24 is seated on the lower mold part 202' as described previously, and then the upper mold part 206' is brought down onto the disc-rim subassembly so as to insert core structure 402 downwardly through the disc opening 30' until surfaces 426 and 428 abut. Then further clamping pressure is exerted downwardly on part 206 to produce one final small increment of motion wherein, as can be seen by comparing FIGS. 12 and 13, funnel 314 enters pour opening 290 and both seals 410 and 416 are compressed axially so as to bulge radially outwardly to their positions shown in FIG. 13. In this compressively stressed condition upper seal 410 is bulged outwardly into sealing engagement with the inner periphery of disc opening 30. Likewise, lower seal 416 has been bulged radially outwardly to provide the exterior contour which forms the overlay wall 50c. This squeeze pressure also insures a tight seal between surfaces 426 and 428 to minimize flash at the parting line of the mold.

The liquid urethane reaction mixture is then poured into the mold cavity defined by and between the lower mold surface 230, the outboard face of disc 24 and associated rim 22 and laminated core structure 402. After the urethane reaction mixture has cured upper mold part 206 is released and raised to withdraw the same from disc 24, and then the finished metal-elastomer composite styled wheel is removed from the mold with the urethane overlay 26' permanently adhered as a decorative body to the outboard face of the wheel. Retainer 100' is thus now fully and permanently embedded in the urethane material of overlay 26', ready to perform its function as a hub cap retention reinforcement and provide the aforementioned improved results and advantages of the invention.

I claim:

1. In a composite styled wheel including in combination a metallic portion comprising a wheel mounting disc and a rim secured to said disc and adapted to receive a tire thereon, and a plastic portion comprising an ornamental overlay disposed adjacent and covering at least part of the outboard face of said metallic portion, said overlay comprising a body of plastic material permanently affixed to said metallic portion, the outboard face of said body being exposed to view from the outboard side of said wheel having a contour differing from the contour of the covered part of the outboard face of said metallic portion and adapted to provide decorative contour over at least part of the metallic portion of said wheel, said covered part of said metallic portion comprising said disc and said disc having a central aperture and wheel mounting fastener holes therein, said overlay having aperture means including an internal annular surface registering coaxially with said central aperture and holes in said disc and defining a central cavity in said body adapted to receive wheel hub and mounting parts therein, the improvement wherein said aperture means comprises retainer means secured to said body and being spaced radially outwardly from said cavity annular surface, said overlay material engulfing said retainer means so as to at least partially embed said retainer means in said overlay to thereby hide said retainer means from view and assist in securement thereof to said body, said body and said retainer means having cooperative detent means disposed in the vicinity of the outboard face of said body encircling the outboard entrance to said body cavity and adapted to yieldably releasably engage a center ornament hub cap or the like for removable attachment of the same to said body to close the outboard end of said body cavity.

2. The wheel construction set forth in claim 1 wherein said overlay is cast and cured against said metallic portion with said retainer means pre-secured in situ to said body.

3. The wheel construction set forth in claim 1 wherein said overlay aperture means includes circumferentially spaced projection means and said retainer detent means comprises resilient yieldable means circumferentially registered with said overlay projection means for snap-in retention of the hub cap on said overlay.

4. The wheel construction set forth in claim 3 wherein said retainer means comprises a split annulus member having radially re-entrant bowed portions disposed within said projection means to reinforce said overlay projection means.

5. The wheel construction set forth in claim 1 wherein said retainer means is formed of resilient material and said detent means thereof has portions disposed radially inwardly adjacent said cavity annular surface generally flush with the radially innermost portion of said overlay body detent means.

6. The wheel construction set forth in claim 1 wherein said retainer means has a generally hoop-like configuration with a series of circumferentially spaced anchor bite portions extending axially from the plane of the hoop and radially outwardly therefrom toward said disc, said retainer being circumferentially continuous and having arcuate portions between said bit portions contiguous with said cavity annular surface.

7. The wheel construction set forth in claim 1 wherein said retainer means has anchoring means spaced radially outwardly from said detent means thereof covered by the material of said overlay to provide a support for said retainer means, said retainer detent means substantially surfacing at said cavity annular surface to provide support for said body detent means.

8. A composite wheel including in combination a metallic portion comprising a wheel mounting disc and a rim secured to said disc and adapted to receive a tire thereon, and a plastic portion comprising an ornamental overlay body disposed adjacent and covering at least part of the outboard face of said metallic portion, said body being permanently adhesively affixed to said metallic portion, the outboard face of said body being exposed to view from the outboard side of said wheel and having a decorative surface spaced axially of the wheel outboard from the covered part of the outboard face of said metallic portion, said outboard face of said body having a contour differing from the contour of the covered part of the outboard face of said metallic portion and adapted to provide decorative contour over at least part of the metallic portion of said wheel, said body having hub cap retainer means secured thereto comprising at least in part a resilient member having anchor means projecting therefrom inwardly of said outboard face of said body into said body and anchoring said retainer means thereto, said body comprising a solid material cast from a liquid material and said retainer means being embedded in said cast material prior to solidification thereof.

9. The composite wheel as set forth in claim 8 wherein said body includes circumferentially spaced projection means extending outwardly from said body, and said retainer means includes detent means circumferentially registered with said body projection means and being resiliently yieldable for a snap-in retention of a hub cap on said outboard face of said body.

10. The composite wheel as set forth in claim 9 wherein said retainer means comprises a split annulus member having bowed portions disposed within said body projection means to reinforce the same.

11. The composite wheel as set forth in claim 8 wherein said retainer means has a generally hoop-like configuration with a series of circumferentially spaced anchor bite portions extending axially from the plane of the hoop and radially outwardly therefrom toward said wheel disc, said retainer means being circumferentially continuous and having arcuate portions between said bite portions contiguous with said body projection means.

12. The composite wheel as set forth in claim 8 wherein said retainer means includes detent means substantially surfacing at an outer surface of said body to provide support for an exterior portion of said body adapted for resilient snapin engagement with a hub cap.

* * * * *